(12) United States Patent
Margulis et al.

(10) Patent No.: US 7,463,671 B2
(45) Date of Patent: Dec. 9, 2008

(54) RAKE RECEIVER INTERFACE

(75) Inventors: Alex Margulis, Ashdod (IL); Gadi Mazuz, Shoham (IL); Udi Ben-David, Oranit (IL)

(73) Assignee: Marvell World Trade Ltd., St. Michael (BB)

( * ) Notice: Subject to any disclaimer, the term of this patent is extended or adjusted under 35 U.S.C. 154(b) by 1379 days.

(21) Appl. No.: 10/076,957

(22) Filed: Feb. 19, 2002

(65) Prior Publication Data

US 2003/0156626 A1 Aug. 21, 2003

(51) Int. Cl.
*H04B 1/69* (2006.01)

(52) U.S. Cl. .................... 375/147; 710/260

(58) Field of Classification Search ........... 370/320, 370/335, 342; 375/147, 140, 130, 316, 150, 375/148, 349; 710/260, 261, 265, 267
See application file for complete search history.

(56) References Cited

U.S. PATENT DOCUMENTS

| | | | | |
|---|---|---|---|---|
| 5,420,894 A * | 5/1995 | Boslough et al. | ............ | 375/372 |
| 5,867,527 A * | 2/1999 | Ziv et al. | ............ | 375/147 |
| 5,881,058 A * | 3/1999 | Chen | ............ | 370/335 |
| 6,122,311 A * | 9/2000 | Watanabe et al. | ............ | 375/147 |
| 6,356,581 B1 * | 3/2002 | Nguyen et al. | ............ | 375/148 |
| 6,650,694 B1 * | 11/2003 | Brown et al. | ............ | 375/150 |
| 6,717,976 B1 * | 4/2004 | Shen | ............ | 375/147 |
| 6,718,449 B2 * | 4/2004 | Phi | ............ | 711/167 |
| 6,721,295 B1 | 4/2004 | Brown | | |
| 6,792,031 B1 * | 9/2004 | Sriram et al. | ............ | 375/147 |
| 2001/0036195 A1 * | 11/2001 | Garyantes et al. | ............ | 370/441 |
| 2001/0046205 A1 * | 11/2001 | Easton et al. | ............ | 370/209 |
| 2002/0061751 A1 * | 5/2002 | Zhao | ............ | 455/442 |
| 2003/0086481 A1 * | 5/2003 | Sih et al. | ............ | 375/147 |
| 2005/0105643 A1 * | 5/2005 | Fitch et al. | ............ | 375/303 |

FOREIGN PATENT DOCUMENTS

| | | |
|---|---|---|
| EP | 1128565 A2 | 8/2001 |
| GB | 2332839 A | 6/1999 |

OTHER PUBLICATIONS

Kim, Y. H., "Data Transmitting Method in CDMA Type Mobile Communication System Base Station Controller", Derwent Accession No. 2002-359505, Derwent Abstract corresponding to KR 2001 109 663 A (Samsung Electronics Co. Ltd.), Dec. 12, 2001, two pages.
U.S. Appl. No. 60/183,457, entitled "Correlator Coprocessor (Uplink)", by Pierre Bertrand et al., filed Feb. 18, 2000.

* cited by examiner

*Primary Examiner*—Chieh M. Fan
*Assistant Examiner*—Aristocratis Fotakis

(57) ABSTRACT

In some embodiments of the present invention, a method and apparatus to generate interrupts in a transfer of information between a rake receiver and a processor, said interrupts having a rate of generation per unit time independent of a rate of the transfer of information per unit time.

14 Claims, 4 Drawing Sheets

RAKE RECEIVER INTERFACE

BACKGROUND OF THE INVENTION

A code division multiple access (CDMA) receiver may comprise a rake receiver, which may include multiple receiving elements, called fingers, which de-spread a received signal. A finger may be synchronized to a path of a multi-path channel between a base station and a mobile receiver. Information, such as symbols bounded by symbol boundaries, may be transferred from the fingers to a processor.

However, the timing of one finger may change independently of another finger, due to such factors as a dynamic environment and movement of the mobile station, for example. The lack of synchronization of the fingers may make it difficult for the processor to recognize the symbol boundaries for a particular finger.

In one possible solution, a finger may generate "interrupts" at a rate synchronized to the symbol boundary rate of the finger. The processor may read and process a fixed number of symbols between successive interrupts. For example, if the interrupt rate were equal to the symbol rate, then the number of symbols bounded by successive interrupts would be equal to the number of symbols bounded by successive symbol boundaries.

A disadvantage of the abovementioned interrupt method may be that a very large processing and memory overhead may be required to process a large number of fingers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
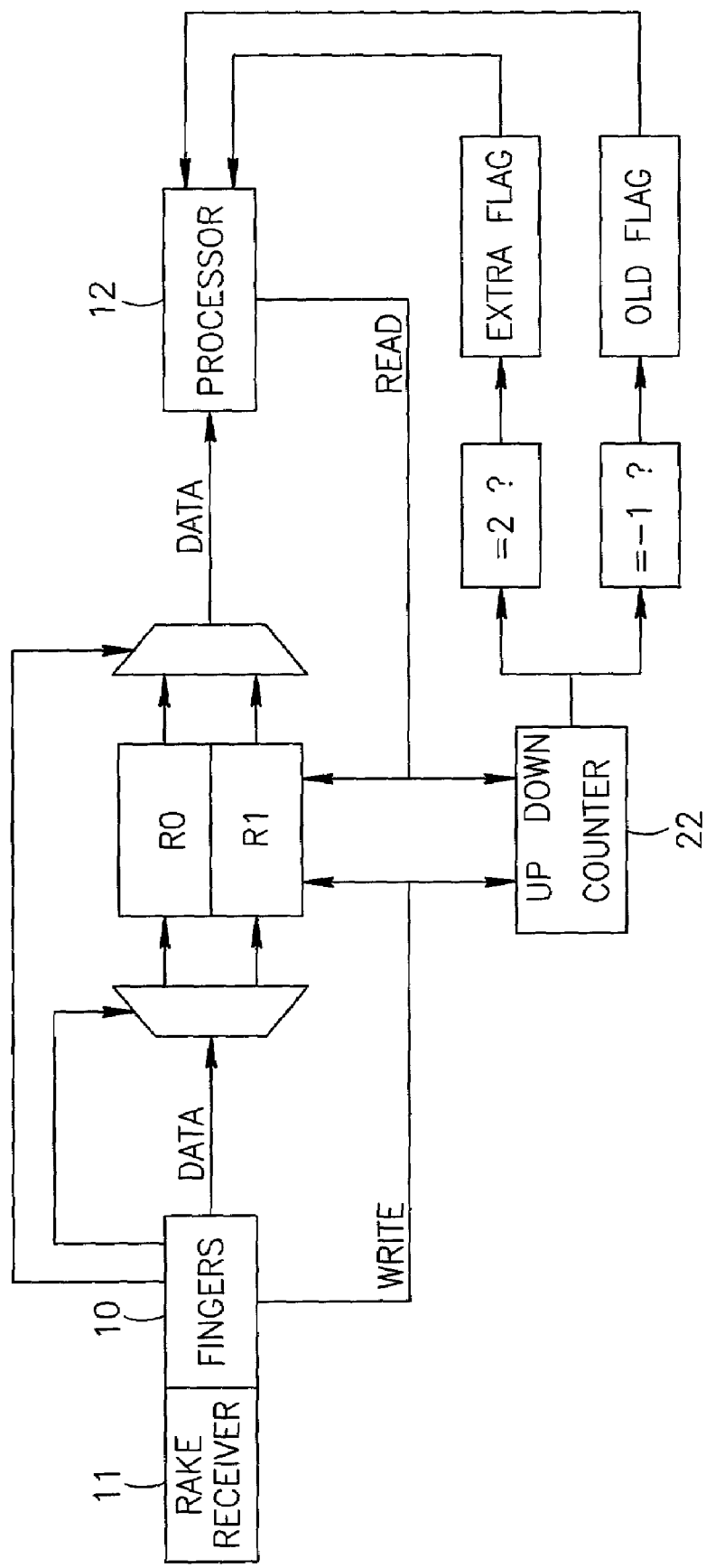
FIG. 1 is a simplified block diagram of a method and apparatus for interfacing with a rake receiver, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Reference is now made to FIG. 1, which illustrates a method and apparatus for interfacing with a rake receiver, in accordance with an embodiment of the invention.

Figure 2:
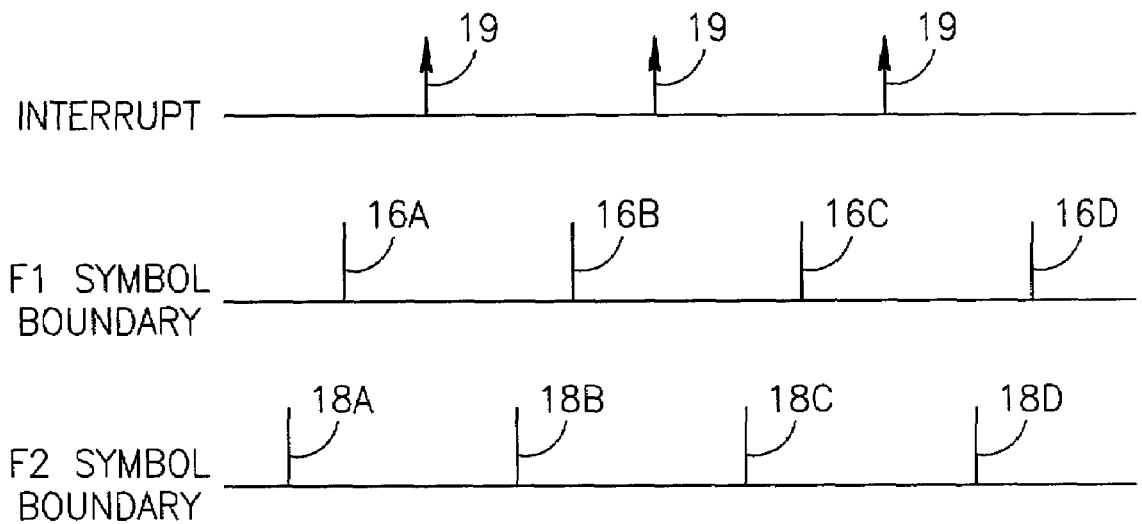
FIG. 2 is a simplified block diagram of fingers of a rake receiver, having symbol boundaries with different rates, and with interrupts generated at a rate independent of the symbol boundary rates, in accordance with an embodiment of the invention.

The apparatus may comprise one or more fingers 10 of a rake receiver 11, which may transfer information to a processor 12, as seen in FIG. 1. Processor 12 may comprise, without limitation, a digital speech processor (DSP). The information may comprise, without limitation, symbols having symbol boundaries. For example, as seen in FIG. 2, a first finger F1 may comprise symbol boundaries 16A-16D, which may have a certain time rate, e.g., a time spacing between adjacent symbol boundaries. The symbol boundaries may correspond to a spreading sequence epoch, for example. A second finger F2 may comprise symbol boundaries 18A-18D, which may have a different rate.

Interrupts 19 (FIG. 2) may be generated by hardware or software apparatus (such as but not limited to, the fingers, rake receiver or processor or some dedicated device for generating interrupts, for example) in the transfer of information between the rake receiver 11 and processor 12. In accordance with an embodiment of the present invention, the interrupts may have a rate of generation per unit time independent of a rate of the transfer of information per unit time. In the illustrated embodiment, the interrupts are generated in the transfer of symbols between fingers 10 and processor 12, wherein the interrupts have a rate of generation independent of a time rate of the symbol boundaries (e.g., time spacing between adjacent symbol boundaries). For example, the interrupts may be generated with a rate asynchronous with respect to the time rate of the symbol boundaries 16A-16D or 18A-18D, such as, but not limited to, a fixed time rate.

The apparatus of FIG. 1 may form part of a communications system, such as but not limited to, a code division multiple access (CDMA) or wide-band CDMA (WB-CDMA) receiver or communications system, which may comprise communications components.

Figure 3:
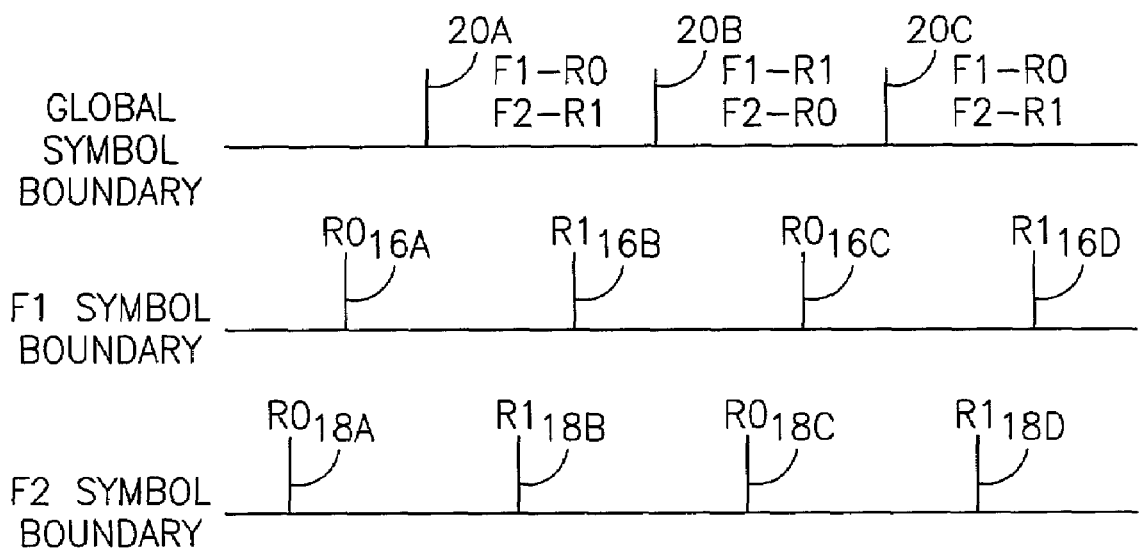
FIG. 3 is a simplified illustration of generating interrupts in the transfer of symbol boundaries to a processor, in accordance with an embodiment of the invention, wherein the timing of the fingers may remain constant.

Reference is now made to FIG. 3, which illustrates one embodiment of the invention for generating interrupts in the transfer of symbol boundaries to the processor 12. The timing of the interrupts may be defined as global symbol boundaries 20A-20C, which may be generated at a rate independent of the time rate of symbol boundaries 16A-16D and 18A-18D.

Two fingers F1 and F2 may write data (e.g., symbols from the respective symbol boundaries) to either of first and second data registers R0 and R1. It is noted that this is merely a simplified example, and the invention is not limited to two fingers or data registers, and may employ any other number of fingers or data registers. FIG. 3 illustrates the case wherein the timing of the fingers F1 and F2 may remain constant, and wherein the global symbol boundaries 20A-20C may have a fixed rate. For example, starting at a symbol boundary 16A and ending at a symbol boundary 16B, finger F1 may write information (e.g., symbols) to first data register R0. Afterwards, starting at symbol boundary 16B and ending at a symbol boundary 16C, finger F1 may write information to second data register R1, and so on. Likewise, starting at a symbol boundary 18A and ending at a symbol boundary 18B, finger F2 may write information (e.g., symbols) to second data register R1. Afterwards, starting at symbol boundary 18B and ending at a symbol boundary 18C, finger F2 may write information to first data register R0, and so on.

The global symbol boundaries 20A-20C may determine how the processor 12 reads the information. The rate (or also referred to as the length) of the global symbol boundaries 20A-20C may be set such that the processor 12 may read alternately from the data registers independently of the rate at which the fingers F1 and F2 write to the data registers. For example, starting at a global symbol boundary 20A and ending at a global symbol boundary 20B, the processor 12 may read information received from finger F1 from first data register R0, and information received from finger F2 from second data register R1. Afterwards, starting at global symbol boundary 20B and ending at a global symbol boundary 20C, the processor 12 may read information received from finger F1 from second data register R1, and information received from finger F2 from first data register R0, and so on.

Accordingly, in the embodiment of FIG. 3, the first and second fingers F1 and F2 may write to an available one of the first and second data registers, and in the global symbol boundaries, the processor may alternatively read from the first and second data registers at a rate independent of the fingers. The data registers may be toggled by the fingers during "write", and toggled by the processor 12 during "read".

As mentioned hereinabove, FIG. 3 illustrates the case wherein the timing of the fingers F1 and F2 may remain constant, and wherein the global symbol boundaries may have a fixed rate. The global symbol boundaries may be set such that while the processor 12 may be reading symbols of the first finger F1 from the first data register R0, for example, the first finger F1 may not be writing at that time to data register R0. Likewise, while the processor 12 may be reading symbols of the first finger F1 from the second data register R1, for example, the first finger F1 may not be writing at that time to data register R1. Accordingly, no information may be written over by the fingers in the data registers while reading from the data registers. Moreover, a data register may always be available for a particular finger to write thereto, while the processor 12 is reading from another data register. This may prevent missing information from one of the fingers due to a lack of an available data register.

Figure 4:
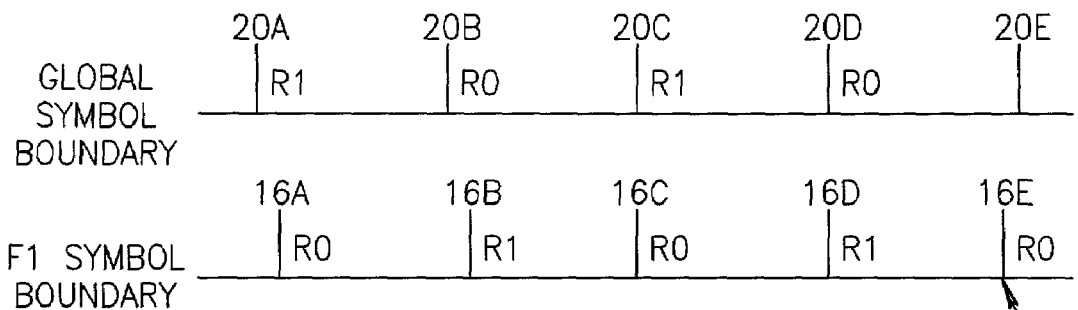
FIG. 4 is a simplified illustration of a "collision" between "reading to" and "writing from" the same data register, wherein the timing of the fingers may vary.

Reference is now made to FIG. 4, which illustrates a case wherein the timing of one of the fingers (e.g., the rate of the symbol boundaries) may vary with time, such as may happen during time tracking, for example. Although processing techniques may be used to vary the global symbol boundaries in accordance with the variance in the timing of the fingers, it may be advantageous and cost-effective to maintain the global symbol boundaries at a fixed rate.

In FIG. 4, the global symbol boundaries 20A-20E have a fixed rate. The rate of the symbol boundaries 16A-16E of finger F1 may change. For example, the rate of the symbol boundaries may advance (in other words, become shorter) while writing to data register R1 as opposed to data register R0. As indicated by reference arrow 25, between symbol boundaries 16D and 16E, this may lead to the situation wherein the finger F1 may write to data register R0 at the same time that the processor may be reading from data register R0. There is thus a "collision" between "reading to" and "writing from" the same data register. A similar problem may occur as a result of "hold" operations, wherein the effective symbol length may be increased.

Figure 5:
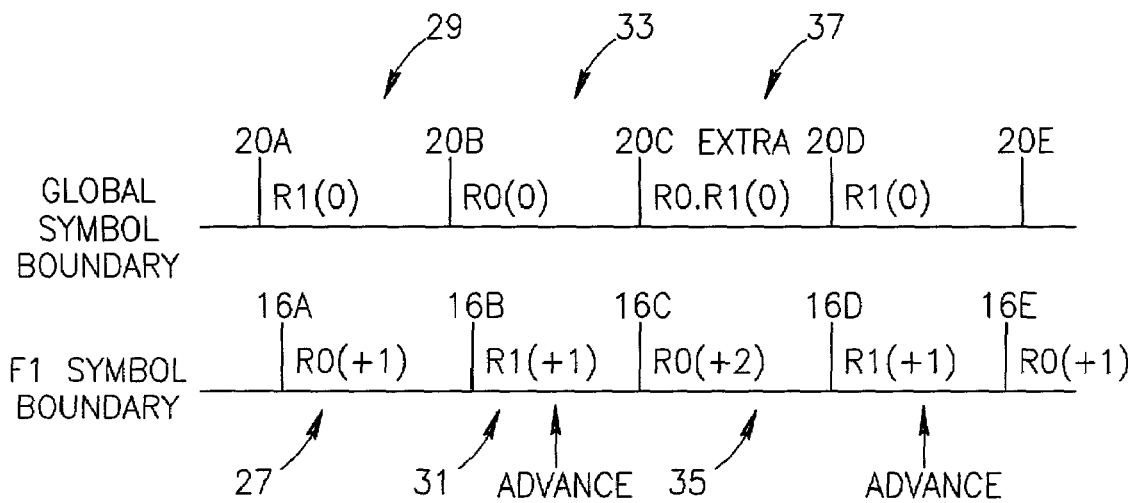
FIG. 5 is a simplified illustration of an embodiment of the invention that may prevent such a collision, wherein the timing of the fingers has advanced.

Reference is now made to FIG. 5, which illustrates an embodiment of the invention that may prevent such a collision. The apparatus of FIG. 1 may be provided with one or more counters 22. When a finger writes to one of the data registers, the counter 22 may be incremented. Conversely, when the processor 12 reads from one of the data registers, the counter 22 may be decremented. The counter 22 may be incremented or decrement by one or any other predetermined value.

In the embodiment of FIG. 3, wherein the timing of the fingers F1 and F2 may remain constant, the sequence of the counter values would be +1, 0, +1, 0, +1 . . .

However, in the embodiment of FIG. 5, the rate of the symbol boundaries 16 of finger F1 may change with time. As indicated by reference arrow 27, when the finger F1 writes to data register R0, the counter 22 (FIG. 1) may be incremented +1. At the same time, the processor 12 may read from data register R1, which may decrement the counter 22 to 0, as indicated by reference arrow 29. Afterwards, the finger F1 may write to data register R1, and the counter 22 may be incremented +1, as indicated by reference arrow 31, whereas the processor 12 may read from data register R0, which may decrement the counter 22 to 0, as indicated by reference arrow 33. However, the timing of finger F1 may have advanced, with the result that finger F1 may start writing to register R0 before the processor 12 has completed reading from data register R0, as indicated by reference arrow 35. This may increment the counter 22 by +1 to +2. In accordance with an embodiment of the invention, if the counter 22 reaches +2 or any other predetermined value, an "extra flag" may be raised, instructing the processor 12 to read both registers R0 and R1, to which finger F1 has written, in the same global symbol boundary, as indicated by reference arrow 37, before reading from another global symbol boundary. The act of reading from two registers may double decrement the counter 22 back to zero. After the counter 22 has returned to zero, the normal sequence of toggling (alternatively reading and alternatively writing) between 0 and +1 (such as the sequence associated with the embodiment of FIG. 3) may be restored.

Figure 6:
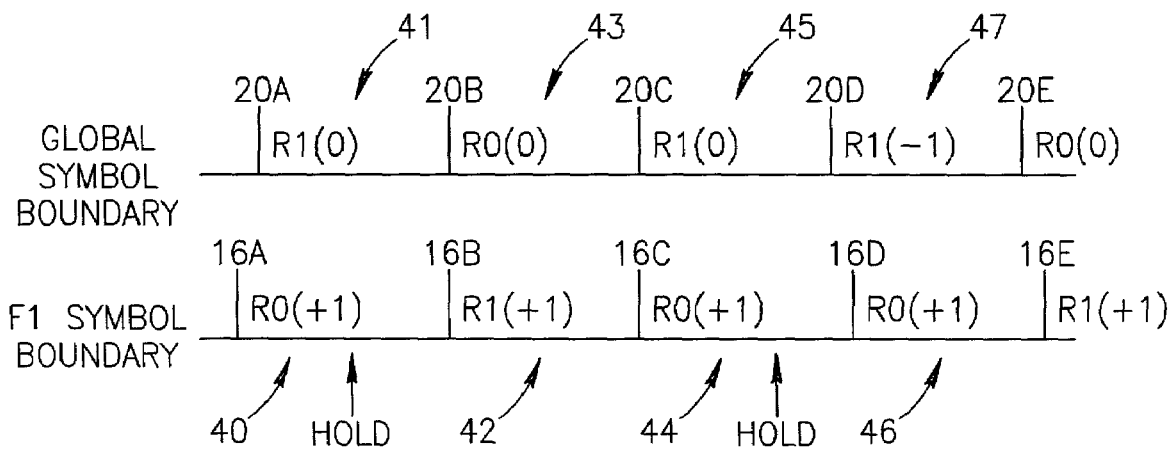
FIG. 6 is a simplified illustration of an embodiment of the invention that may prevent such a collision, wherein the timing of the fingers has retarded.

Reference is now made to FIG. 6, which illustrates an embodiment of the invention that may prevent a read-write collision, wherein the timing of the finger F1 slows down.

As indicated by reference arrow 40, when the finger F1 may write to data register R0, the counter 22 may be incremented +1. At the same time, the processor 12 may read from data register R1, which may decrement the counter 22 to 0, as indicated by reference arrow 41. Afterwards, the finger F1 may write to data register R1, and the counter 22 may be incremented +1, as indicated by reference arrow 42, whereas the processor 12 may read from data register R0, which may decrement the counter 22 to 0, as indicated by reference arrow 43. Once again, the finger F1 may write to data register R0, and the counter 22 may be incremented +1, as indicated by reference arrow 44, whereas the processor 12 may read from data register R1, which may decrement the counter 22 to 0, as indicated by reference arrow 45.

However, the timing of finger F1 may have slowed down, with the result that finger F1 may still be writing to register R0 when the processor 12 has completed reading from data register R1 and starts reading from register R0, as indicated by reference arrow 46. This may decrement the counter 22 by −1 from zero to −1. In accordance with an embodiment of the invention, if the counter 22 reaches −1 or any other predetermined value, an "old flag" may be raised, instructing the processor 12 not to switch to read another data register (in this example, not to switch to data register R0), but rather to continue reading from the current data register to which finger F1 has written (in this example, data register R1), as indicated by reference arrow 47, and to zero the counter 22.

After the counter 22 has returned to zero, the normal sequence of toggling between 0 and +1 (such as the sequence associated with the embodiment of FIG. 3) may be restored.

Figure 7:
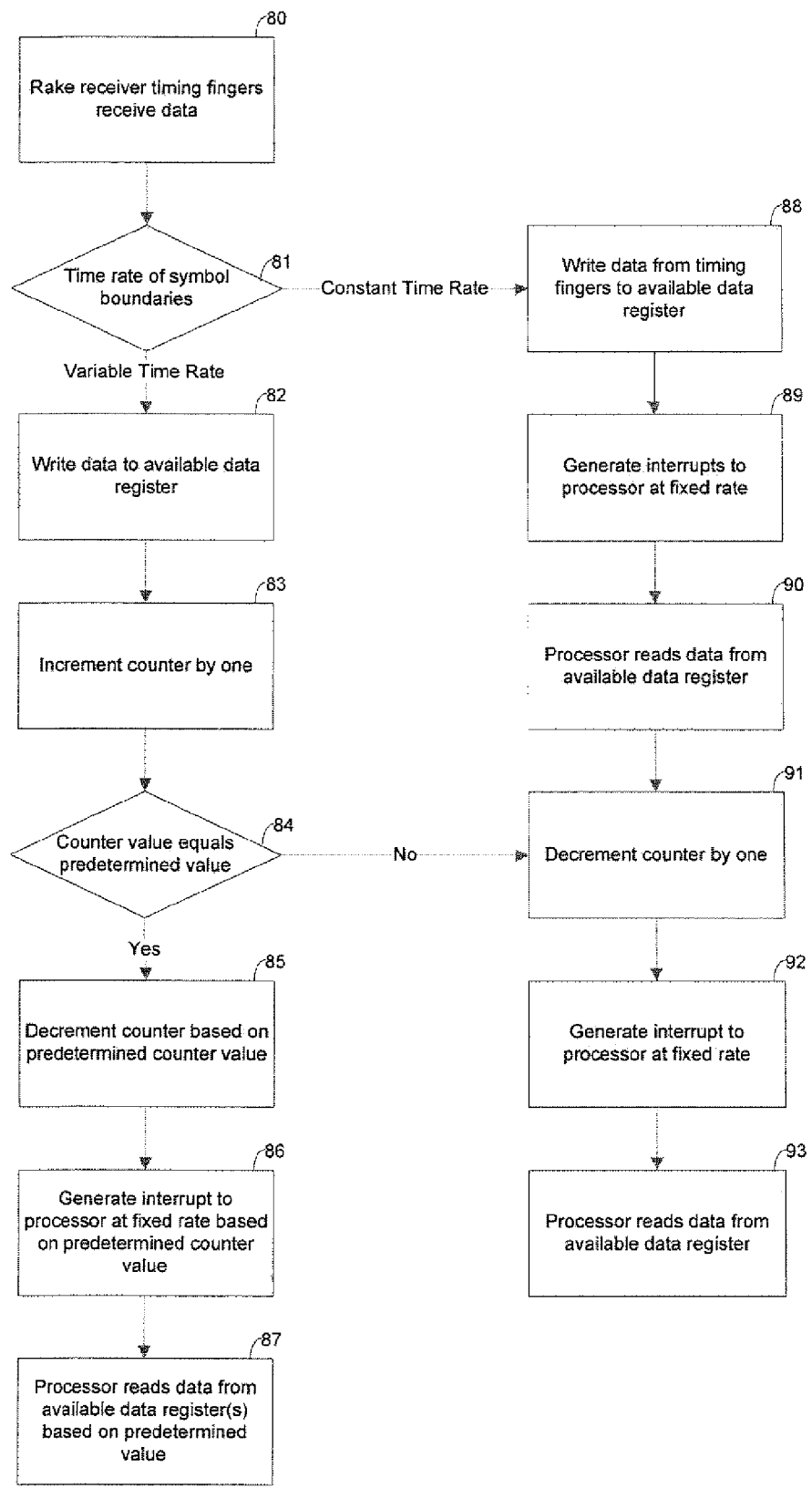
FIG. 7 is a simplified illustration of a flowchart depicting an embodiment of a method for generating interrupts in a transfer of information between a rake receiver and a processor.

FIG. 7 illustrates an exemplary method for generating interrupts in a transfer of information between a rake receiver and a processor. In step 80, a rake receiver containing multiple timing fingers de-spreads a received signal. In step 81, the time rate of the symbol boundaries are determined. In the exemplary embodiment of FIG. 7, if the time rate of symbol boundaries remain constant, data symbols are transferred from the timing fingers to an available data register, as depicted in step 88. In step 89, the timing fingers generate interrupts to the processor. Here, the interrupts have a fixed rate and have a rate of generation per unit time independent of a time rate of symbol boundaries. In step 90, the processor reads data from the available data registers.

If however, the time rate of symbol boundaries is variable, as depicted in step 81, the timing fingers write data to an available data register, as shown in step 82. A counter is incremented by one, as depicted in step 83. In step 84, the counter value is checked against a predetermined value. If the counter value equals the predetermined counter value, in step 85, the counter is decremented based on the predetermined counter value. In step 86, the timing fingers generate an interrupt resulting from step 85 which may occur at a fixed rate independent of the timing rates of the symbol boundaries. In the exemplary embodiment of FIG. 7, the interrupts are generated asynchronously with respect to the timing rates of the symbol boundaries. In step 87, the processor may either read more than one first data register and a second data register to which one of the fingers has written or may continue to read one of the first data register and second data register during a given interrupt.

If the a predetermined counter value is not met, as depicted in step 84, the counter is decremented by one, as depicted in step 91. In step 92, the timing fingers generate interrupts. The interrupts are generated at a fixed rate, which are independent and asynchronous with respect to the timing symbol boundaries. In step 93, the processor reads the data from the available data registers resulting from the interrupts generated in step 92.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
generating a plurality of interrupts in a transfer of symbols from fingers of a rake receiver to a processor, the interrupts corresponding to global symbol boundaries having a first rate independent of a time rate of symbol boundaries, wherein the processor reads symbol data from a plurality of data registers at the first rate independent of a second rate that the plurality of fingers write symbol data to the plurality of data registers;
writing symbols from a first of said fingers to an available one of a first data register and a second data register;
writing symbols from a second of said fingers to another available one of said first data register and said second data register;
reading symbols from said first data register and said second data register;
incrementing a counter when writing symbols to one of said first data register and said second data register;
decrementing the counter when reading symbols from one of said first data register and said second data register; and
if said counter reaches a predetermined value, reading more than one of said first data register and said second data register to which one of said fingers has written, in a given one of said global symbol boundaries, before reading from another of said global symbol boundaries.

2. A method comprising:
generating a plurality of interrupts in a transfer of symbols from fingers of a rake receiver to a processor, the interrupts corresponding to global symbol boundaries having a first rate independent of a time rate of symbol boundaries, wherein the processor reads symbol data from a plurality of data registers at the first rate independent of a second rate that the plurality of fingers write symbol data to the plurality of data registers;
writing symbols from a first of said fingers to an available one of a first data register and a second data register;
writing symbols from a second of said fingers to another available one of said first data register and said second data register;
reading symbols from said first data register and said second data register;
incrementing a counter when writing symbols to one of said first data register and said second data register;
decrementing the counter when reading symbols from one of said first data register and said second data register; and
if said counter reaches a predetermined value, continuing to read one of said first data register and said second data register in a given one of said global symbol boundaries, before reading from another of said global symbol boundaries.

3. An apparatus comprising:
a rake receiver having a plurality of fingers;
a processor for receiving interrupts, each interrupt signaling a transfer of a symbol from one of the plurality of fingers of the rake receiver to the processor at a first rate independent of a time rate of symbol boundaries,
wherein a first of said fingers writes symbols to an available one of a first data register and a second data register at a second rate, and a second of said fingers writes symbols to another available one of said first data register and said second data register at the second rate, and said processor reads symbols from said first data register and said second data register in global symbol boundaries at the first rate independent of the second rate; and
a counter that increments when symbols are written to one of said first data register and said second data register,
wherein, if said counter reaches a predetermined value, said processor reads more than one of said first data register and said second data register to which one of said fingers has written, in a given one of said global symbol boundaries, before reading from another of said global symbol boundaries.

4. An apparatus comprising:
a rake receiver having a plurality of fingers;
a processor for receiving interrupts, each interrupt signaling a transfer of a symbol from one of the plurality of fingers of the rake receiver to the processor at a first rate independent of a time rate of symbol boundaries, wherein a first of said fingers writes symbols to an available one of a first data register and a second data register at a second rate, and a second of said fingers writes symbols to another available one of said first data register and said second data register at the second rate, and said processor reads symbols from said first data register and said second data register in global symbol boundaries at a first rate independent of the second rate; and a counter that decrements when symbols are read from one of said first data register and said second data register, wherein, if said counter reaches a predetermined value, said processor reads more than one of said first data register and said second data register to which one of said fingers has written, in a given one of said global symbol boundaries, before reading from another of said global symbol boundaries.

5. An apparatus comprising:

a rake receiver having a plurality of fingers;

a processor for receiving interrupts, each interrupt signaling a transfer of a symbol from one of the plurality of fingers of the rake receiver to the processor at a first rate independent of a time rate of symbol boundaries, wherein a first of said fingers writes symbols to an available one of a first data register and a second data register at a second rate, and a second of said fingers writes symbols to another available one of said first data register and said second data register at the second rate, and said processor reads symbols from said first data register and said second data register in global symbol boundaries at a first rate independent of the second rate; and a counter that increments when symbols are written to one of said first data register and said second data register, wherein, if said counter reaches a predetermined value, said processor continues reading one of said first data register and said second data register in a given one of said global symbol boundaries, before reading from another of said global symbol boundaries.

6. An apparatus comprising:

a rake receiver having a plurality of fingers;

a processor for receiving interrupts, each interrupt signaling a transfer of a symbol from one of the plurality of fingers of the rake receiver to the processor at a first rate independent of a time rate of symbol boundaries, wherein a first of said fingers writes symbols to an available one of a first data register and a second data register at a second rate, and a second of said fingers writes symbols to another available one of said first data register and said second data register at the second rate, and said processor reads symbols from said first data register and said second data register in global symbol boundaries at a first rate independent of the second rate; and a counter that decrements when symbols are read from one of said first data register and said second data register, wherein, if said counter reaches a predetermined value, said processor continues reading one of said first data register and said second data register in a given one of said global symbol boundaries, before reading from another of said global symbol boundaries.

7. A method comprising:

generating a plurality of interrupts in a transfer of symbols from fingers of a rake receiver to a processor at a first rate independent of a time rate of symbol boundaries;

generating global symbol boundaries at the first rate;

writing symbols from a first finger to an available one of a first data register and a second data register at a second rate;

writing symbols from a second finger to another available one of a first data register and a second data register at the second rate;

reading symbols from the first data register and the second data register based on the global symbol boundaries at the first rate independent of the second rate;

incrementing a counter when writing symbols to one of the first data register and the second data register;

decrementing the counter when reading symbols from one of the first data register and the second data register; and if the counter reaches a predetermined value, reading more than one of the first data register and the second data register to which one of the fingers has written, in a given one of the global symbol boundaries, before reading from another of the global symbol boundaries.

8. A method comprising:

generating a plurality of interrupts in a transfer of symbols from fingers of a rake receiver to a processor at a first rate independent of a time rate of symbol boundaries;

generating global symbol boundaries at the first rate;

writing symbols from a first finger to an available one of a first data register and a second data register at a second rate;

writing symbols from a second finger to another available one of a first data register and a second data register at the second rate;

reading symbols from the first data register and the second data register based on the global symbol boundaries at the first rate independent of the second rate;

incrementing a counter when writing symbols to one of the first data register and the second data register;

decrementing the counter when reading symbols from one of the first data register and the second data register; and if the counter reaches a predetermined value, continuing to read one of the first data register and the second data register in a given one of the global symbol boundaries, before reading from another of the global symbol boundaries.

9. An apparatus comprising:

a rake receiver having a plurality of fingers, a first of the fingers for writing symbols to an available one of a first data register and a second data register at a first rate and a second of the fingers for writing symbols to another available one of the first data register and the second data register at the first rate;

a processor for receiving interrupts corresponding to global symbol boundaries having a second rate independent of a time rate of symbol boundaries;

the processor alternatively reads symbols from the first data register and the second data register at the global symbol boundaries at the second rate independent of the first rate; and a counter that increments when symbols are written to one of the first data register and the second data register and decrements when reading symbols from one of the first data register and the second data register, wherein, if the counter reaches a predetermined value, the processor reads more than one of the first data register and the second data register to which one of the fingers has written, in a given one of the global symbol boundaries, before reading from another of the global symbol boundaries.

10. An apparatus comprising:

a rake receiver having a plurality of fingers, a first of the fingers for writing symbols to an available one of a first data register and a second data register at a first rate and a second of the fingers for writing symbols to another available one of the first data register and the second data register at the first rate;

a processor for receiving interrupts corresponding to global symbol boundaries having a second rate independent of a time rate of symbol boundaries;

the processor alternatively reads symbols from the first data register and the second data register at the global symbol boundaries at the second rate independent of the first rate; and a counter that increments when writing symbols to one of the first data register and the second data register and decrements when reading symbols from one of the first data register and the second data register, wherein, if the counter reaches a predetermined value, the processor continues reading one of the first data register and the second data register in a given one of the global symbol boundaries, before reading from another of the global symbol boundaries.

11. The method according to claims 1, 2, 7, or 8, wherein interrupts are generated with a fixed rate.

12. The method according to claims 1, 2, 7, or 8, wherein said symbol boundaries have a constant rate or a rate that changes with time.

13. The apparatus according to claims 3, 4, 5, 6, 9, or 10, wherein interrupts are generated with a fixed rate.

14. The apparatus according to claims 3, 4, 5, 6, 9, or 10, wherein said symbol boundaries have a constant rate or a rate that changes with time.

\* \* \* \* \*